United States Patent Office 3,178,808
Patented Apr. 20, 1965

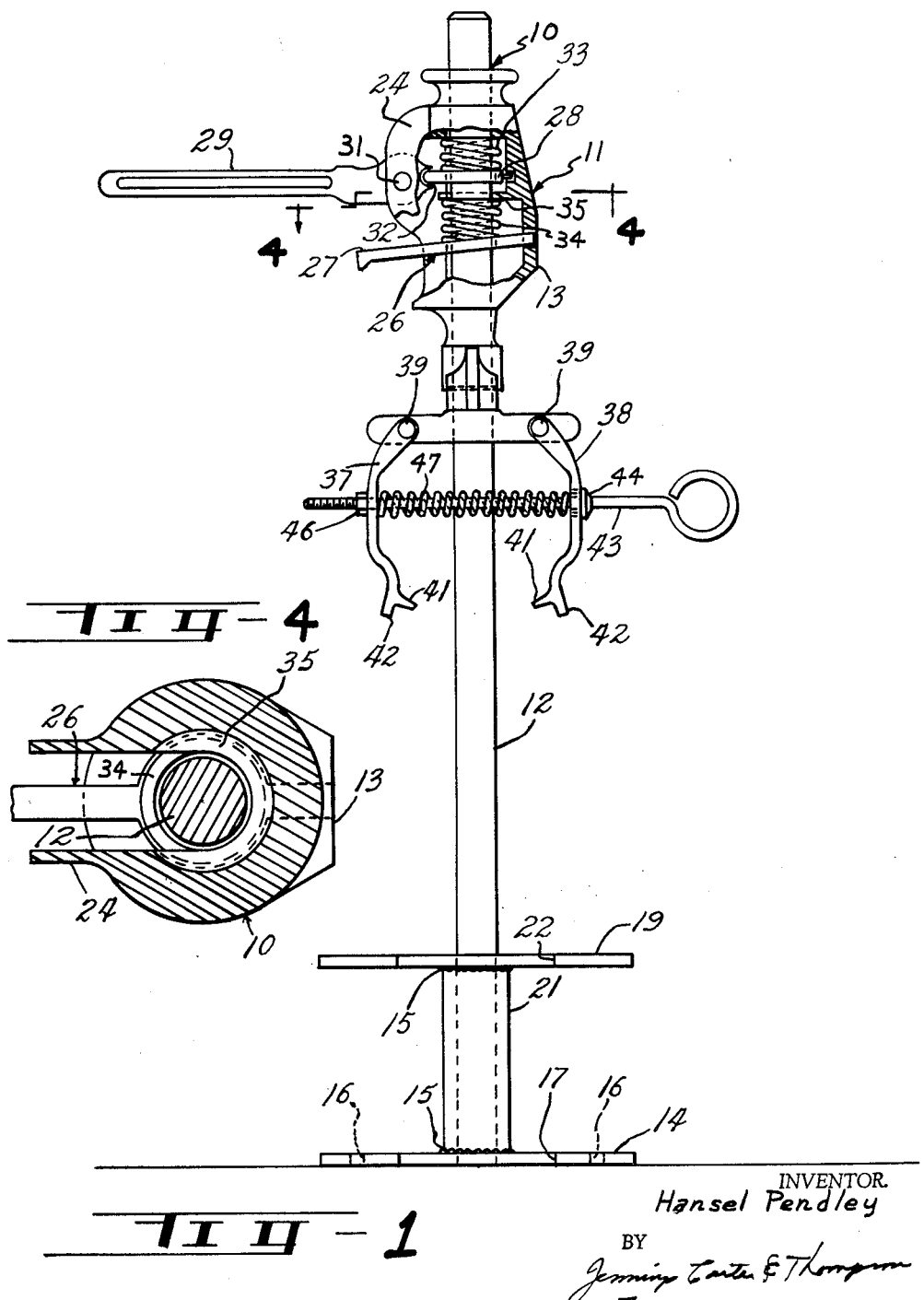

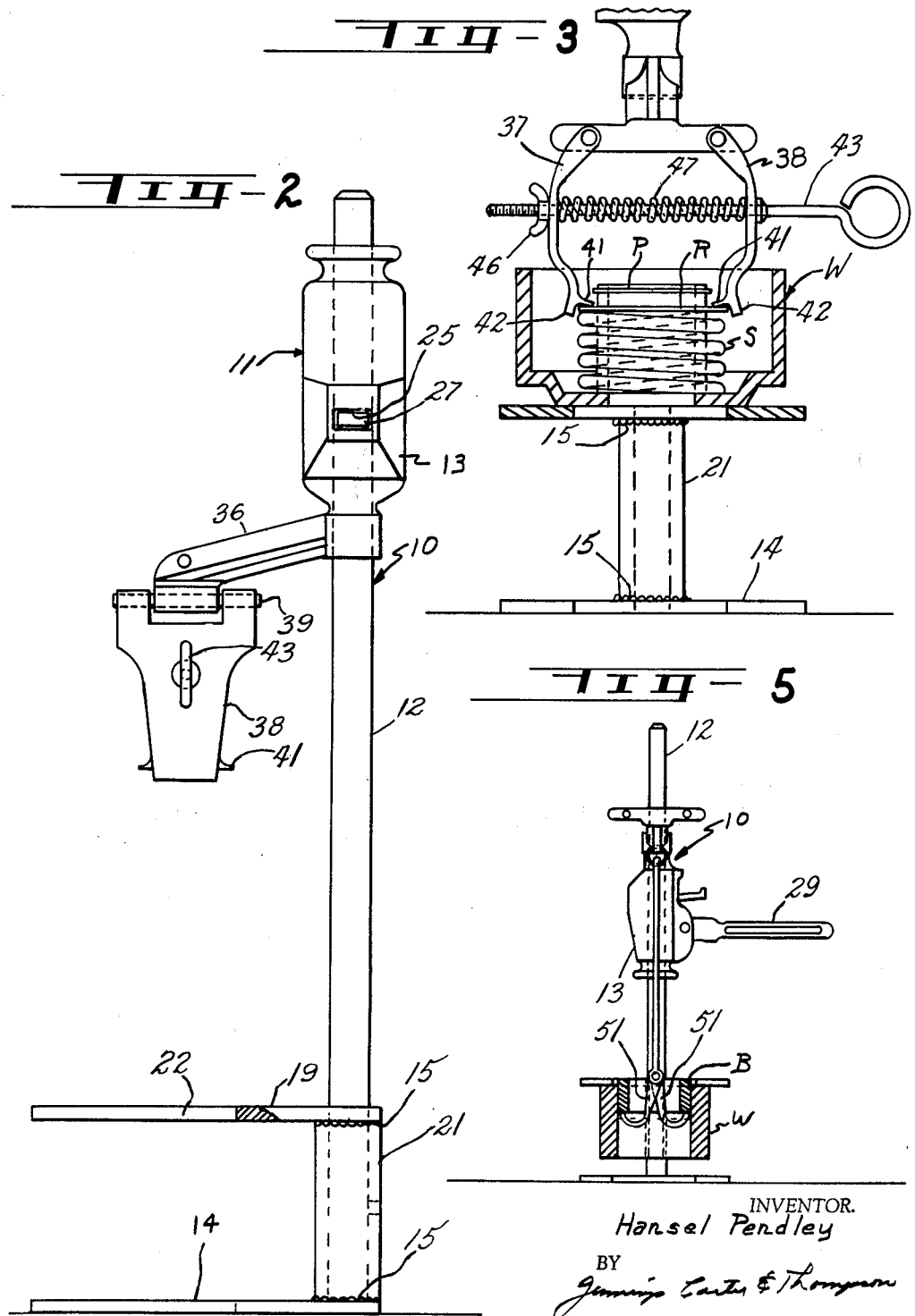

3,178,808
TOOL TO REMOVE SPRINGS AND THE LIKE
Hansel Pendley, 3517 N. 27th St., Birmingham, Ala.
Filed Mar. 7, 1962, Ser. No. 178,530
1 Claim. (Cl. 29—227)

This application is a continuation-in-part of my application Serial No. 25,620, filed April 29, 1960, and entitled "Automobile Clutch Spring Compression Tool," now abandoned.

This invention relates to a tool for assembling and disassembling workpieces in which certain parts are biased apart by springs, and more particularly to such a tool embodying a friction jack with a pair of arms mounted on the movable part thereof and adapted to engage a slidable part of the workpiece to compress the springs therein whereby the usual lock rings or other means holding the parts assembled may be removed or replaced.

Heretofore, in the assembly and disassembly of apparatus such as the clutch drums of transmissions of different sizes and makes, it has been necessary in many instances to employ adapters or fittings specially sized and shaped for different types and sizes of clutch drums, whereby some form of press or press-like tool could be brought to exert force at the proper place on the workpiece.

It is an object of the present invention to provide a press-like tool which is adaptable for use on spring pressed clutch parts and the like of different makes or sizes and comprising a pair of workpiece engaging arms adjustable in a minimum of time to properly engage the collars, sleeves, or springs of such devices, facilitating the job at hand.

A further object is to provide a press-like tool comprising a friction jack embodying a generally vertically extending shaft with a work support secured thereto and a sleeve movable by friction dogs along the shaft, the movable sleeve carrying a pair of pivotally mounted arms with their work engaging, free ends adapted to move toward and from each other to engage workpieces of varying sizes. By providing a friction jack, any desired increment of movement of the sleeve along the shaft may be provided which is beneficial in many instances such as where only a very small movement of the sleeve is desired. The amount of movement of the sleeve may be controlled by the movement of the actuating handle therefor.

Another object is to provide a press-like tool having a vertically extending shaft with a base on the lower end thereof and a work support secured to the shaft above the base to support a workpiece thereon, the work support having a forwardly opening slot therein to accommodate the workpiece.

A tool embodying features of my invention is shown in the accompanying drawings, forming a part of this application, in which:

FIG. 1 is a front elevational view of my tool and showing a friction jack carrying a pair of adjustable arms, a portion of the jack being broken away to show the operation thereof;

FIG. 2 is a side elevational view of the tool shown in FIG. 1, partly in section;

FIG. 3 is a fragmentary, enlarged elevational view with certain parts broken away, of the arms engaging a workpiece mounted on the work support secured to the vertically extending shaft;

FIG. 4 is a cross sectional view taken generally along the line 4—4 of FIG. 1; and, FIG. 5 is an elevational view of the tool assembled so that the power stroke of the jack is reversed to exert pull on a workpiece.

Referring now to the drawings for a better understanding of my invention, I indicate my improved tool generally by the numeral 10. Tool 10 comprises a friction jack 11 embodying a vertically extending shaft 12 and a movable sleeve indicated generally by the numeral 13 surrounding shaft 12 for axial movement therealong.

Shaft 12 is supported from a base 14 secured to the lower end thereof. The base has suitable openings 16 therethrough so that the tool may be secured by fasteners (not shown) to a work bench or the like. Base 14 is U-shaped and has an outwardly opening slot 17 therein so that workpieces with shafts or the like thereon may extend through the slot, it being understood that a suitable hole will be provided in the work bench, in alignment with the slot 17.

A work support 19 is secured to shaft 12 above base 14. A sleeve 21 around shaft 12 serves to space the work support 19 above base 14. The sleeve may be welded to support 19 and base 14 as at 15. Support 19 has an outwardly opening U-shaped slot 22 therein so that a shaft or boss extending from a clutch part or other workpiece may fit therein and extend below support 19.

Sleeve 13 may be in the form of a housing 24 having a friction holding ring 26 fitting loosely about shaft 12 and with its rear end loosely fitted within a slot in the housing so that ring 26 can tilt relative to shaft 12. An extension 27 on the forward end of holding ring 26 projects through a vertically elongated slot 25 in housing 24. A jacking ring 28 is mounted loosely about shaft 12 and fits loosely in a slot in the rear wall of housing 24. A handle 29 is pivotally mounted on the front of the housing at 31 and has a notch 32 which receives the front end of ring 28. Interposed between the upper surface of ring 28 and the upper portion of housing 24 is a compression spring 33 fitting about shaft 12. Interposed between the upper surface of holding ring 26 and a generally semi-circular downwardly facing boss or ledge 35 formed in the housing is a compressing spring 34.

From what has been described it will be understood that downward movement of handle 29 pivots the front of ring 28 upwardly whereby the forward or front edge of the hole bites or frictionally engages the forward side of shaft 12. This forces the entire housing to move downwardly, it being noted that the lower ring 26 centers itself about the shaft 12 to permit downward movement of the housing, but due to spring 34 locks the housing against upward movement until ring 26 is manually centered by pulling up on trigger 27.

A support bracket 36 is rigidly secured to the front side of sleeve 13. A pair of opposed arms 37 and 38 pivotally mounted on pins 39, extend downwardly from the bracket. The pins 39 permit the lower ends of arms 37 and 38 to pivot toward and away from each other, thereby to accommodate workpieces of different sizes. The lower ends of arms 37 and 38 carry inwardly extending lugs 41 and downwardly extending lugs 42. An adjusting rod 43 extends slidably through enlarged openings in arms 37 and 38 and a collar 44 thereon engages the outer surface of arm 38. The other end of rod 43 is threaded and nut 46 abuts the outer surface of arm 37. Spring 47 extends about rod 43 and urges arms 37 and 38 outwardly in engagement with abutment 44 and nut 46. The spacing of the working ends of arms 37 and 38 may thus be varied by adjustment of rod 43.

Referring to FIG. 3, a workpiece is indicated generally by the numeral W and comprises a drum having spring S therein and a circular ring R contacting the upper surface of spring S while being held by a snap ring P. When in proper position, lugs 41 of arms 37 and 38 engage the upper surface of ring R and lugs 42 fit downwardly alongside the ring. Lugs 41 and 42 are arcuate in shape thereby to fit around circular ring R. Upon sleeve 13 being jacked downwardly by handle 29, lugs 41 depress spring S through contact with ring R and thereby allow snap ring P to be removed.

In operation, sleeve 13 is lowered until arms 37 and 38 are in contact with ring R. Then arms 37 and 38 are adjusted to the diameter of snap ring P so as to clear ring S. Next, sleeve 13 is jacked downwardly and arms 37 and 38 press ring R and spring S downwardly, thereby to permit removal of snap ring P. Upon removal of snap ring P, trigger 27 may be actuated to release sleeve 13 and thereby release the tension on spring S. It should be noted that sleeve 13 may rotate freely about shaft 12 and when spring S is removed, arms 37 and 38 may be rotated to the side of workpiece W thereby allowing free access to the working area within the workpiece.

Referring to FIG. 5, I show a way of using my invention to exert a pulling instead of a compressive force on a workpiece as in the embodiment shown in FIGS. 1–4. Sleeve 13 is inverted and placed on shaft 12 so as to operate in a direction opposite that shown in FIGS. 1–4. Upon upward movement of handle 29 sleeve 13 moves upwardly. Pulling arms 51 are secured to the lower portion of sleeve 13 and are adapted to pull a bushing B or the like which is press fitted within a workpiece W. Upon actuation of handle 29, bushing B is pulled upwardly from workpiece W through the upward movement of sleeve 13.

From the foregoing, it will be understood that I have provided a tool to remove and replace springs on clutch drums or the like in which a friction jack is provided embodying a sleeve mounted for movement along a generally vertically extending shaft. The sleeve carries a pair of adjustable arms which are adapted to move toward and away from each other, thereby to engage workpieces of varying sizes. A work support is secured to the shaft and is adapted to support a workpiece thereon, the support preferably being U-shaped, thereby to form a forwardly opening slot which permits a shaft, boss, collar, or the like extending from the workpiece to pass through the support. The sleeve may be moved any desired increment along shaft 12 by the movement of handle 29. Thus, the movement of a spring or the like on which the tool is exerting a force may be accurately gauged.

While I have shown my invention in but one form, it will be obvious to those skilled in the art that it is not so limited but is susceptible of various other changes and modifications without departing from the spirit thereof, and I desire, therefore, that only such limitations shall be placed thereupon as are specifically set forth in the appended claim.

What I claim is:

In a tool,
(a) a friction jack embodying a force transmitting shaft extending in a generally vertical direction and a sleeve mounted about the jack for axial movement therealong,
(b) a work support secured to the shaft and extending laterally outwardly therefrom,
(c) means to raise and lower the sleeve along the shaft,
(d) a bracket rigidly secured to the sleeve adjacent the end thereof nearest the work support and extending from that end of the sleeve laterally outwardly over the work support,
(e) a pair of oppositely disposed arms pivotally mounted on spaced horizontally disposed pins carried by said bracket and having lower ends adapted to engage a workpiece on the work support in force transmitting relation,
(f) a rod extending between the arms,
(g) means on the rod to restrain the outward pivotal movement of the arms and adjustable to vary the spacing between the lower ends of the arms in a generally horizontal direction, and
(h) resilient means surrounding the rod and located between the arms to urge the arms outwardly.

References Cited by the Examiner

UNITED STATES PATENTS

| | | | |
|---|---|---|---|
| 1,590,159 | 6/26 | Gillentine | 29—261 |
| 2,523,069 | 9/50 | Slack | 29—283 |
| 2,560,929 | 7/51 | Calbeck | 29—238 |
| 2,718,253 | 9/55 | Zinke | 29—267 |
| 3,010,191 | 11/61 | McCullough | 29—283 |

WILLIAM FELDMAN, *Primary Examiner.*

NEDWIN BERGER, MILTON S. MEHR, *Examiners.*